(12) United States Patent
Kosaka et al.

(10) Patent No.: US 8,173,237 B2
(45) Date of Patent: May 8, 2012

(54) METHOD FOR JOINING STRIPS, STRUCTURE OF JOINT, AND CONTINUOUS STRIP OBTAINED BY THE METHOD

(75) Inventors: Tokuhisa Kosaka, Ibaraki (JP); Masatoshi Mamiya, Ibaraki (JP); Isao Hirose, Ibaraki (JP); Shinji Inokuchi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 517 days.

(21) Appl. No.: 12/385,270

(22) Filed: Apr. 3, 2009

(65) Prior Publication Data
US 2009/0258177 A1 Oct. 15, 2009

(30) Foreign Application Priority Data
Apr. 10, 2008 (JP) .................... 2008-102831

(51) Int. Cl.
*B32B 3/00* (2006.01)
*B32B 7/10* (2006.01)
*B31F 5/06* (2006.01)
(52) U.S. Cl. .............. 428/60; 156/304.3; 156/304.5
(58) Field of Classification Search .......... 156/159, 156/304.1, 304.3, 304.5; 428/58, 60, 61, 428/343, 352
See application file for complete search history.

(56) References Cited

U.S. PATENT DOCUMENTS

| | | | | |
|---|---|---|---|---|
| 2,683,679 A * | 7/1954 | Hurd et al. | ............ | 428/57 |
| 2,726,222 A * | 12/1955 | Palmquist et al. | ............ | 524/272 |
| 3,770,540 A * | 11/1973 | Fuchs et al. | ............ | 156/157 |
| 5,320,698 A * | 6/1994 | Fournier et al. | ............ | 156/159 |
| 6,124,010 A * | 9/2000 | Shih | ............ | 428/61 |
| 6,468,615 B2 * | 10/2002 | Weinstein et al. | ............ | 428/43 |
| 7,581,320 B2 * | 9/2009 | Achiwa et al. | ............ | 30/131 |

FOREIGN PATENT DOCUMENTS

| | | |
|---|---|---|
| EP | 2050801 A1 | 4/2009 |
| FR | 2850974 A1 | 8/2004 |
| JP | 2007-217553 | 8/2007 |
| WO | WO-89/09129 A1 | 10/1989 |

OTHER PUBLICATIONS

European Search Report dated Sep. 7, 2009, issued on the European patent application No. 09004368.8.

* cited by examiner

*Primary Examiner* — Mark A Osele
(74) *Attorney, Agent, or Firm* — Edwards Wildman Palmer LLP

(57) ABSTRACT

Disclosed is a method for joining two strips, where the two strips each include a laminate of a release liner and a pressure-sensitive adhesive layer, and the release liner extends from the corresponding pressure-sensitive adhesive layer in a longitudinal end region of at least one of the two strips. The method includes butting cross-sections of longitudinal ends of the pressure-sensitive adhesive layers of the two strips to bond the two pressure-sensitive adhesive layers; and superposing end regions of the release liners of the two strips and fixing the release liners so that surfaces of the release liners in portions at least 1 mm long inward from the longitudinal ends are not in contact with surfaces of the pressure-sensitive adhesive layers. This method gives a continuous strip from which the release liner can be smoothly removed without "binding" even at the joint.

20 Claims, 3 Drawing Sheets

METHOD FOR JOINING STRIPS, STRUCTURE OF JOINT, AND CONTINUOUS STRIP OBTAINED BY THE METHOD

BACKGROUND OF THE INVENTION

1. Field of the Invention

The present invention relates to a method for joining two strips each including a laminate of a release liner and a pressure-sensitive adhesive layer. It relates also to the structure of a joined portion (joint) formed by the method, and to a continuous strip composed of two or more strips joined by the method.

2. Description of the Related Art

Strips each including a pressure-sensitive adhesive layer and a release liner (such as pressure-sensitive adhesive tapes) are used in a variety of fields (typically see Japanese Unexamined Patent Application Publication (JP-A) No. 2007-217553 corresponding to US20070190280A). During manufacture of strips, the strips are joined with each other typically when a failed portion, if occurring, is removed and the residual portions are joined to give a product, or when short-length strips are joined to give a long (continuous) product.

Of these strips, pressure-sensitive adhesive tapes each having a pressure-sensitive adhesive layer composed of an acrylic foam and thereby being thick have been joined by a method in FIG. 4. In this method, an end cross-section of one pressure-sensitive adhesive tape is butted against an end cross-section of the other pressure-sensitive adhesive tape to thereby bond the two pressure-sensitive adhesive layers (2a and 2b) with each other, and two release liners (1a and 1b) are affixed through a pressure-sensitive adhesive tape (hereinafter also referred to as a "joint tape").

The resulting continuous strip (pressure-sensitive adhesive tape) composed of strips joined by the above method, however, suffers from problems when the release liners are removed from the pressure-sensitive adhesive tape upon use. More specifically, with reference to FIG. 5, there is an edge 10 (release edge) of one release liner at the joint portion, and the peel force locally increases at the edge portion to cause "binding (catch or hang-up)". Thus, the peeling workability is insufficient, or the release liner breaks to reduce the productivity. Additionally, there occur problems in product quality. Typically, the increased peel force at the edge portion causes a crevice in the joint between the pressure-sensitive adhesive layers, and sealing at the joint portion becomes insufficient.

SUMMARY OF THE INVENTION

Accordingly, an object of the present invention is to provide a method for joining strips each including a laminate of a release liner and a pressure-sensitive adhesive layer, to give a continuous strip which does not cause an edge of a release liner at the joint portion upon removal or peeling of the release liner from the continuous strip, and which is superior in workability and productivity. Another object of the present invention is to provide a joint structure formed by the method; and a continuous strip composed of strips joined by the method.

After intensive investigations to achieve the objects, the present inventors have found that the occurrence of the edge of the release liner at the joint portion upon removal of a release liner from the continuous strip can be prevented by allowing a release liner in an end region of at least one of object two strips to extend from the corresponding pressure-sensitive adhesive layer; and superposing and fixing the release liners so that the surfaces of the release liners in portions of a predetermined length from a longitudinal end are not in contact with the surfaces of the pressure-sensitive adhesive layers. The present invention has been made based on these findings.

Specifically, according to an embodiment of the present invention, there is provided a method for joining two strips, in which the two strips each include a laminate of a release liner and a pressure-sensitive adhesive layer, and the release liner extends from the corresponding pressure-sensitive adhesive layer in a longitudinal end region of at least one of the two strips. The method includes the steps of: butting cross-sections of longitudinal ends of the pressure-sensitive adhesive layers of the two strips against each other to thereby bond the two pressure-sensitive adhesive layers with each other; and bringing together end regions of the release liners of the two strips to form a superposed portion and fixing the release liners so that surfaces of the release liners in portions at least 1 mm long inward from the longitudinal ends are not in contact with surfaces of the pressure-sensitive adhesive layers.

According to another embodiment, the method is carried out so that the release liner of one of the two strips partially lies on the pressure-sensitive adhesive layer of the other strip.

According to still another embodiment, the method includes the steps of: removing the pressure-sensitive adhesive layer of at least one of the two strips by at least 2 mm long from a longitudinal end of the strip so as to allow the release liner to extend from the end region of the corresponding pressure-sensitive adhesive layer; butting cross-sections of longitudinal ends of the pressure-sensitive adhesive layers of the two strips against each other to thereby bond the two pressure-sensitive adhesive layers with each other; bringing end regions of the two release liners at least partially into contact with each other so as to allow their sides having been faced the pressure-sensitive adhesive layers to face each other to form a superposed portion; folding the superposed portion; and applying a single-sided pressure-sensitive adhesive tape from above the folded portion to thereby fix the two release liners.

According to another embodiment of the present invention, there is provided a joint structure of strips, as the structure of a joined portion between two strips, in which the two strips each include a laminate of a release liner and a pressure-sensitive adhesive layer, and in which the strips are joined by any of the above-mentioned methods to form the joint structure.

There is further provided, according to yet another embodiment, a continuous strip which includes two or more strips, in which the strips each include a laminate of a release liner and a pressure-sensitive adhesive layer, and in which the two or more strips are joined by any of the above-mentioned methods to form the continuous strip.

There is further provided, according to still another embodiment, a method for joining two strips, in which the two strips each include a laminate of a release liner and a pressure-sensitive adhesive layer, and the release liner extends from the corresponding pressure-sensitive adhesive layer in a longitudinal end region of at least one of the two strips. The method includes the steps of: butting cross-sections of longitudinal ends of the pressure-sensitive adhesive layers of the two strips against each other to thereby bond the two pressure-sensitive adhesive layers with each other; superposing the two release liners in the joined portion so that a release side, the release side being a surface facing the pressure-sensitive adhesive layer, of one release liner is in contact with a back side, the back side being opposite to the release side, of the other release liner; affixing an adhesive face of a single-sided pressure-sensitive adhesive tape to a lower side of the superposed portion of the release liners, the lower side facing the pressure-sensitive adhesive layer, the single-sided pressure-sensitive adhesive tape having a releasable layer on its back side; and affixing an adhesive face of another single-sided pressure-sensitive adhesive tape to an upper side of the superposed portion, the upper side not facing the pressure-sensitive adhesive layer.

According to another embodiment of the present invention, there is provided a joint structure of strips, as a structure of a joined portion between two strips, in which the two strips each include a laminate of a release liner and a pressure-sensitive adhesive layer, and in which the strips are joined by the method just mentioned above to form the joint structure.

According to yet another embodiment of the present invention, there is provided a continuous strip including two or more strips, in which the strips each include a laminate of a release liner and a pressure-sensitive adhesive layer, and in which the two or more strips are joined by the method just mentioned above to form the continuous strip.

The pressure-sensitive adhesive layers to be used in these methods may contain bubbles and/or hollow microspheres.

The release liners to be used in these methods may contain one or more olefinic resins.

Continuous strips formed by joining strips by any of these methods do not suffer from the occurrence of an edge of a release liner, which causes "binding (or catch)", at the joint portion upon removal of the release liner therefrom. The workability and productivity in processes using the continuous strips are thereby improved.

These and other objects, features, and advantages of the present invention will be more fully understood from the following description of preferred embodiments with reference to the attached drawings.

BRIEF DESCRIPTION OF THE DRAWINGS

FIGS. 2-1, 2-2, 2-3, and 2-4 are schematic cross-sectional views of an exemplary series of procedures of the method for joining strips according to the first embodiment of the present invention;

FIG. 3 is a schematic cross-sectional view of an exemplary joint portion formed by a method for joining strips according to a second embodiment of the present invention;

FIG. 4 is a schematic cross-sectional view of a joint portion formed by a known method for joining strips.

DESCRIPTION OF THE PREFERRED EMBODIMENTS

Figure 1:
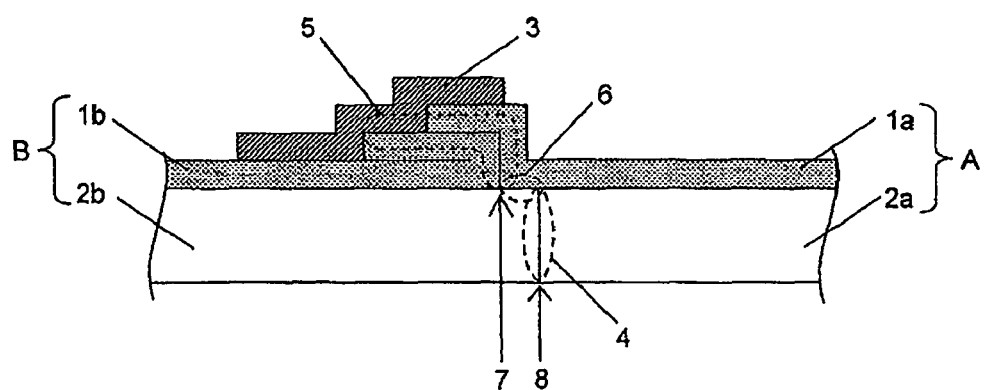
FIG. 1 is a schematic cross-sectional view of an exemplary joint portion in a method for joining strips according to a first embodiment of the present invention.

Certain embodiments of the present invention will be illustrated in detail below, with reference to the attached drawings according to necessity. All numbers are herein assumed to be modified by the term "about." Methods for joining strips according to embodiments of the present invention are methods in which end regions of two strips are joined to form a single strip. The strips each at least structurally include a laminate of a pressure-sensitive adhesive layer and a release liner.

Methods for Joining Strips and Joint Structures

The methods for joining strips will be illustrated below. FIG. 1 and FIGS. 2-1, 2-2, 2-3, and 2-4 are schematic diagrams (cross-sectional views) of a method for joining strips, according to the first embodiment of the present invention. According to this method, a strip A is joined with a strip B. The strip A includes a laminate of a release liner 1a and a pressure-sensitive adhesive layer 2a; and the strip B includes a laminate of a release liner 1b and a pressure-sensitive adhesive layer 2b. The strips A and B are joined by butting (or bringing into contact with each other) cross-sections of longitudinal ends of the pressure-sensitive adhesive layers 2a and 2b to form a bonded portion 4 between the pressure-sensitive adhesive layers 2a and 2b. Further, the release liners 1a and 1b are superposed and fixed so that the surfaces of a portion 5 of at least 1 mm long inward from the longitudinal ends of the respective release liners are not in contact with the surfaces of the pressure-sensitive adhesive layers 2a and 2b. The fixation of the release liners is carried out typically by applying a pressure-sensitive adhesive tape 3 (hereinafter also referred to as "joint tape") onto (from above) the superposed portion. To join the release liners 1a and 1b by the method for joining strips according to the first embodiment, the release liner should extend from the corresponding pressure-sensitive adhesive layer in a longitudinal end region of at least one of the two strips A and B. Namely, the release liner should be longer than the corresponding pressure-sensitive adhesive layer (FIG. 2-2).

The portion where the release liner is not in contact with the pressure-sensitive adhesive layer (portion 5 in FIG. 1) is a portion of at least 1 mm long inward from a longitudinal end of the release liner. The length of the portion 5 is preferably from 2 to 15 mm, and more preferably from 5 to 10 mm. As used herein an "end (longitudinal end)" refers to a longitudinal extreme end (extremity) typically of a strip. As used herein an "end region (longitudinal end region)" generally refers to, but is not limited to, a portion of a certain length inward from the longitudinal end typically of a strip and refers to a portion of a length of at longest about 30 mm from the end. As used herein an "end cross-section" refers to a section (cross section) of an end typically of a strip (portion 9 in FIG. 2-2).

Figures 1, 2:
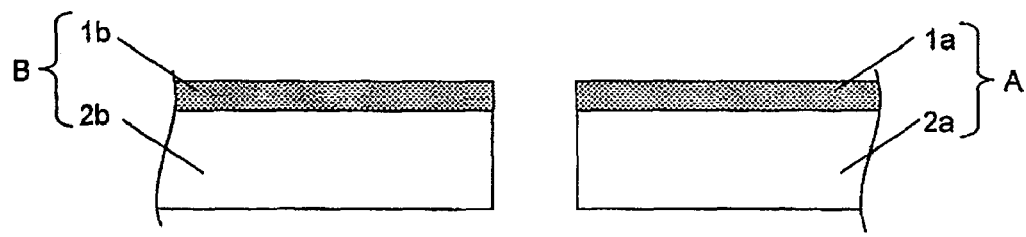
Figure 2:
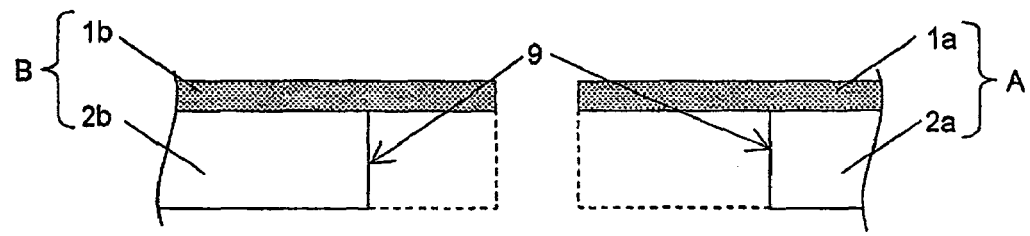

In a preferred embodiment, with reference to FIG. 1, the method is carried out so that the release liner 1a of the strip A partially lies on the pressure-sensitive adhesive layer 2b of the other strip B (in a portion 6 in FIG. 1). In other words, a position 7 where the release liner 1a first comes in contact with the release liner 1b (the farthest position from the end in a portion where the release liner 1a is superposed on the release liner 1b) preferably differs from a position 8 where the pressure-sensitive adhesive layer 2a is bonded with the pressure-sensitive adhesive layer 2b. As used herein the term "position" refers to a "position in a longitudinal direction of the strip."

The way to carry out the joining method is not particularly limited and includes a specific process illustrated in FIGS. 2-1, 2-2, 2-3, and 2-4. Specifically, parts (portions indicated by dashed lines) of longitudinal end regions of the pressure-sensitive adhesive layers 2a and 2b of the two strips A and B are cut and removed so that the release liners extend from the corresponding pressure-sensitive adhesive layers (the release liners are longer than the corresponding pressure-sensitive adhesive layers) (FIG. 2-1 and FIG. 2-2). It is acceptable to remove parts of the pressure-sensitive adhesive layers from the two strips A and B as illustrated in FIG. 2-2 or to remove a part of the pressure-sensitive adhesive layer from only one of the two strips A and B. The portion of the pressure-sensitive adhesive layer to be removed is a portion of preferably at least about 2 mm long inward from the end, more preferably of at least about 5 mm long inward from the end, and further preferably of about 10 to 20 mm long inward from the end.

Figures 2, 3:
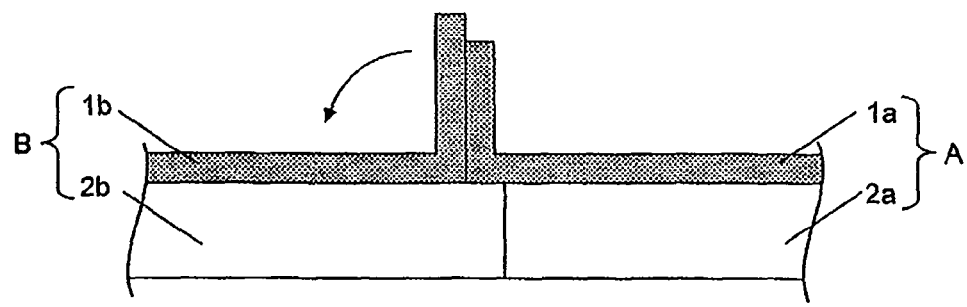

Next, end cross-sections 9 of the pressure-sensitive adhesive layers of the strips A and B are butted or brought into contact with each other to thereby bond the pressure-sensitive adhesive layers. The end regions of the two release liners are at least partially brought into contact with each other so as to allow their release sides to face each other to form a superposed portion. Preferably, a position 7 where the release liners 1a and 1b are in contact with each other on the pressure-sensitive adhesive layer longitudinally deviates from a position 8 where the pressure-sensitive adhesive layers 2a and 2b are bonded with each other. In the step of superposing, the front ends (tips) of the superposed two release liners are preferably not in flush with each other (FIG. 2-3). In an embodiment illustrated in FIG. 2-3, the front end of the release liner 1b is longer than that of the release liner 1a.

Figures 2, 3, 4:
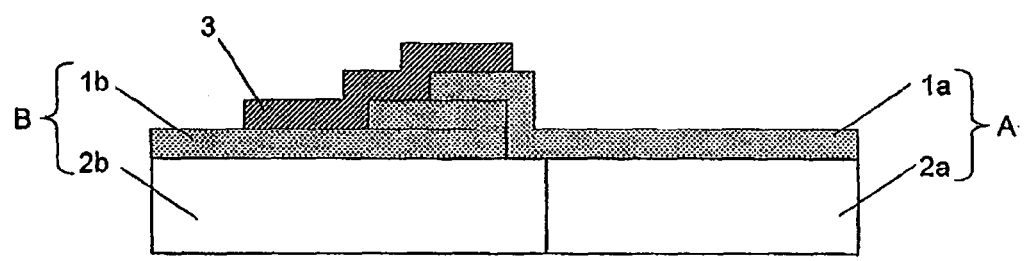
Figure 3:
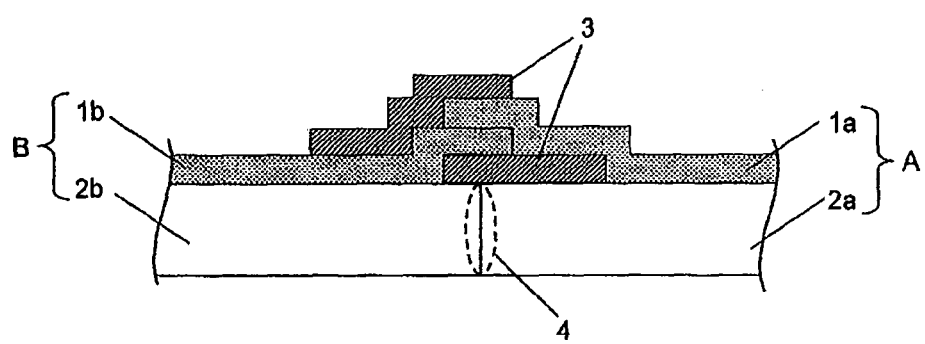
Figure 4:
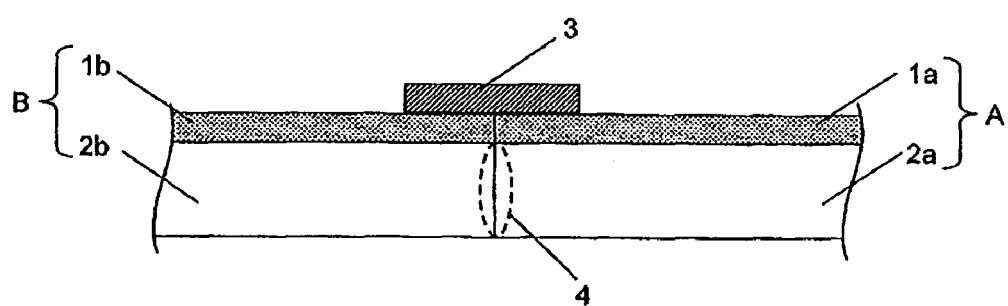

Ultimately, the superposed portion between the release liners is folded so that one of the two release liners exists inside (to face the pressure-sensitive adhesive layer), and the other release liner exists outside; and a pressure-sensitive adhesive tape (joint tape) is applied over the folded portion so as to fix and bond the release liners. The folding step is preferably conducted so that the release liner having a longer front end region in the superposed portion (the release liner 1b in the embodiment of FIG. 2-4) exists inside. By folding the superposed portion so as to allow the release liner 1b to be inside, the joint tape is allowed to be applied to ends of the release liners 1a and 1b, respectively (FIG. 2-4). This makes the peeling of the release liners at the joint portion easier.

The joining method gives a joint structure of two strips in which the pressure-sensitive adhesive layers of the two strips are bonded each other at their longitudinal end cross-sections, and the release liners of the two strips are bonded with each other so that surfaces of the release liners in portions at least 1 mm long inward from the longitudinal ends are not in contact with surfaces of the pressure-sensitive adhesive layers.

Figure 5:
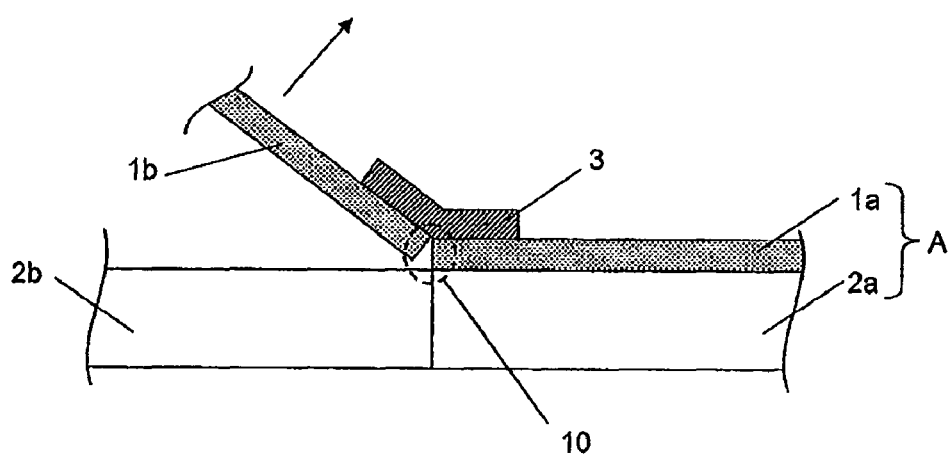
FIG. 5 is a schematic cross-sectional view illustrating how an "edge (release edge)" occurs at the joint portion when a release sheet (release liner) is removed from the resulting strip joined by the known method.

In a joint formed by the method, the surfaces of the portion 5 of the release liners of a predetermined length inward from the ends is not in contact with the pressure-sensitive adhesive layers. This avoids the occurrence of an "edge (release edge)" (edge 10 in FIG. 5) at the joint portion upon removal of the release liner by peeling, and the release liner is thereby removed by peeling with higher workability. In addition, as described above as a preferred embodiment, the position 7 where the release liners are in contact with each other on the pressure-sensitive adhesive layer longitudinally deviates from the position 8 where the pressure-sensitive adhesive layers are bonded with each other; and this prevents detachment between the pressure-sensitive adhesive layers at the bonded portion 8 even when the release liners are removed by peeling. The detachment occurs because the peel stress varies at the portion 7 upon peeling. As used herein an "edge (release edge)" refers to a portion where the longitudinal end portion of a release liner is applied directly onto a pressure-sensitive adhesive layer as in FIG. 5. The peel force sharply increases at the "edge", if occurring during peeling, and this in turn causes "binding", and the peeling may not be conducted with good workability. Additionally, the release liner may break due to the sharply increased peel force, and this may adversely affect the productivity.

FIG. 3 is a schematic diagram (cross-sectional view) of a method for joining strips according to a second embodiment of the present invention. According to this method, a strip A is joined with a strip B, in which the strip A includes a laminate of a release liner 1a and a pressure-sensitive adhesive layer 2a; and the strip B includes a laminate of a release liner 1b and a pressure-sensitive adhesive layer 2b. Specifically, the pressure-sensitive adhesive layers 2a and 2b are bonded with each other by butting end cross-sections of the pressure-sensitive adhesive layers 2a and 2b in their longitudinal ends (to form a bonded portion 4 between the pressure-sensitive adhesive layers). The release liners 1a and 1b are bonded by superposing their longitudinal end regions so that one release liner lies above or over the other to form a superposed portion; and fixing the superposed portion both from above and below (from front side and back side) with pressure-sensitive adhesive tapes (joint tapes), respectively. Specifically, the release liners 1a and 1b are superposed so that the release side of one release liner 1a (side facing the pressure-sensitive adhesive layer 2a) is in contact with the back side (side opposite to the release side) of the other release liner 1b, and the superposed portion is fixed by applying joint tapes both to the upper side (release liner side) and to the lower side (pressure-sensitive adhesive layer side) of the superposed portion. To join or bond the release liners 1a and 1b in this manner, the release liner should extend from the pressure-sensitive adhesive layer in a longitudinal end region in at least one of the strips A and B (FIG. 2-2).

The length (in a longitudinal direction) of the superposed portion is preferably 1 mm or more, and more preferably from 2 to 20 mm.

A joint portion formed according to this joining method does not suffer from an "edge" (edge 10 in FIG. 5) upon removal of the release liners by peeling, and the peeling of the release liners are conducted with good workability, because the superposed portion between the release liners is covered by the joint tapes. Since the joint tape to be in contact with the pressure-sensitive adhesive layer (the joint tape applied to the lower side of the superposed portion according to the second embodiment) has a releasable layer (releasably treated layer) as its back side, the peel force varies little at the interface between the release liner and the joint tape.

Pressure-sensitive adhesive tapes (joint tapes) for use in the joining methods according to embodiments of the present invention are single-sided pressure-sensitive adhesive tapes having a pressure-sensitive adhesive layer as one of two sides. The pressure-sensitive adhesive layer is preferably, but unlimitatedly, composed of a rubber pressure-sensitive adhesive. Exemplary rubber pressure-sensitive adhesives include rubber pressure-sensitive adhesives containing, as base polymers, rubber components such as natural rubbers, styrene-isoprene-styrene block copolymers (SIS block copolymers), styrene-butadiene-styrene block copolymers (SBS block copolymers), styrene-ethylene/butylene-styrene block copolymers (SEBS block copolymers), styrene-butadiene rubbers, polybutadienes, polyisoprenes, polyisobutylenes, butyl rubbers (isobutylene-isoprene rubbers), chloroprene rubbers, silicone rubbers, acrylonitrile-butadiene rubbers, and ethylene-propylene terpolymers. Substrates (carriers) of the joint tapes are not particularly limited and can be substrates for use in known pressure-sensitive adhesive tapes. Exemplary substrates include substrates made from plastic films such as poly(ethylene terephthalate) (PET) films and other polyester films, and polyolefin films; substrates made from nonwoven fabrics; and paper substrates.

A joint tape to be applied to the lower side of the super-posed-portion in the joining method according to the second embodiment (FIG. 3) should have a releasable layer as a side opposite to the pressure-sensitive adhesive layer. The surface of the releasable layer of the joint tape is preferably more easily peelable (having a lower peel force) than the surface of the release liners to be used in the strips. The releasable layer of the joint tape can be made of any material but is preferably made from a silicone release agent. The joint tapes to be used in the joining method according to the first embodiment (FIG. 1) and the joint tape to be applied to the upper side of the superposed portion in the joining method according to the second embodiment (FIG. 3) may have a releasable layer or not.

These joint tapes can be commercially available as products such as "T-200" supplied by Nitto Lifetec Corporation.

Joining two or more strips by the methods according to embodiments of the present invention gives continuous strips. The continuous strips are superior in workability, because the release liner can be satisfactorily peeled off at the joint between strips. They are superior also in productivity and cost, because the pressure-sensitive adhesive layers satisfactorily adhere to each other at the joint portion, and the joint portion can be used also as a product. Exemplary uses of these continuous strips include, but are not limited to, pressure-sensitive adhesive tapes for fixing automotive door gaskets; and pressure-sensitive adhesive tapes for fixing automotive side moldings.

[Strips]

Strips for use in the joining methods according to the present invention each structurally include at least a laminate of a release liner and a pressure-sensitive adhesive layer. The strips may have a structure including a release liner and a pressure-sensitive adhesive layer alone (i.e., the structure of (release liner)/(pressure-sensitive adhesive layer)) or a structure further including one or more other layers such as a substrate layer (such as the structure of (release liner)/(pressure-sensitive adhesive layer)/(substrate layer)).

Among such structures, preferred is a structure that includes a release liner and a pressure-sensitive adhesive layer containing bubbles and/or hollow microspheres (hereinafter a "pressure-sensitive adhesive layer containing bubbles and/or hollow microspheres" is also referred to as a "bubble-containing pressure-sensitive adhesive layer"). This is because strips of this structure have thick pressure-sensitive adhesive layers and are thereby easily joined by the methods according to the present invention.

Release liners for use in the strips are not particularly limited and can be known or common release liners. Exemplary usable release liners include release liners made typically from plastic films and papers whose surfaces are treated with release agents such as silicones, long-chain alkyls, fluorine-containing materials, and molybdenum sulfide; release liners made from fluorine-containing polymers such as polytetrafluoroethylenes, polychlorotrifluoroethylenes, poly(vinyl fluoride)s, poly(vinylidene fluoride)s, tetrafluoroethylene/hexafluoropropylene copolymers, and chlorofluoroethylene/vinylidene fluoride copolymers; and release liners made from a polar polymers including olefinic resins such as polyethylenes and polypropylenes. Among them, silicone-free release liners containing no silicones are preferred, of which release liners made from olefinic resins (olefinic release liners) are more preferred, for preventing adhesion failure, when a continuous strip formed from strips joined by any of the methods according to the present invention (hereinafter also simply referred to as "continuous strip of the present invention") is used typically for bonding automotive components.

These olefinic release liners are preferably used as the release liners particularly when applied to bubble-containing pressure-sensitive adhesive layers as the pressure-sensitive adhesive layers, because they have adequate flexibility and thereby do not suffer from liner lifting (liner pop-off). In contrast, if polyester release liners are used in this case, they are excessively rigid and may thereby suffer from liner pop-off. Additionally, the olefinic release liners are stronger than release liners with paper substrates, thus being more desirable from the viewpoint of strength.

The olefinic release liners are not particularly limited, as long as being release liners including an olefinic film or sheet (polyolefinic film or sheet). They may have a structure of an olefinic film or sheet alone or a structure of an olefinic film or sheet having a releasably treated layer on its surface. The olefinic film or sheet may have a single-layer structure or multilayer structure.

The olefinic film or sheet is composed of one or more olefinic resins (polyolefinic resins). Exemplary olefinic resins include, but are not limited to, polyethylenes such as low-density polyethylenes, linear low-density polyethylenes, metallocene-catalyzed polyethylenes, medium-density polyethylenes, and high-density polyethylenes; polypropylenes; polybutenes such as poly(1-butene)s; poly(4-methyl-1-pentene)s; and α-olefin copolymers such as copolymers between ethylene and an α-olefin having 3 to 10 carbon atoms (hereinafter also referred to as "ethylene-α-olefin copolymers") and copolymers between propylene and an α-olefin having 4 to 10 carbon atoms (hereinafter also referred to as "propylene-α-olefin copolymers"). Exemplary olefinic resins further include copolymers of ethylene with one or more other components than α-olefins, including ethylene-unsaturated carboxylic acid copolymers such as ethylene-acrylic acid copolymers (EAAs) and ethylene-methacrylic acid copolymers (EMAAs); ionomers; ethylene-(meth)acrylic ester copolymers such as ethylene-methyl acrylate copolymers, ethylene-ethyl acrylate copolymers (EEAs), and ethylene-methyl methacrylate copolymers (EMMAs); ethylene-vinyl acetate copolymers (EVAs); and ethylene-vinyl alcohol copolymers. Each of different olefinic resins can be used alone or in combination.

The α-olefin unit having 3 to 10 carbon atoms in the ethylene-α-olefin copolymers (copolymers of ethylene and an α-olefin having 3 to 10 carbon atoms) is preferably at least one α-olefin (comonomer) selected from the group consisting of propylene, 1-butene, 1-hexene, 4-methyl-1-pentene, and 1-octene. Exemplary preferred ethylene-α-olefin copolymers therefore include ethylene-propylene copolymers and ethylene-(1-butene) copolymers. The α-olefin unit having 4 to 10 carbon atoms in the propylene-α-olefin copolymers (copolymers of propylene and an α-olefin having 4 to 10 carbon atoms) is preferably at least one α-olefin (comonomer) selected from the group consisting of 1-butene, 1-hexene, 4-methyl-1-pentene, and 1-octene. Exemplary preferred propylene-α-olefin copolymers therefore include propylene-(1-butene) copolymers.

Of these olefinic resins, preferred are polyethylenes, polypropylenes, and ethylene-α-olefin copolymers, of which polyethylenes are more preferred, and linear low-density polyethylenes, low-density polyethylenes, high-density polyethylenes, and any mixtures of these are furthermore preferred. Preferred as olefinic release liners are therefore polyethylenic release liners using polyethylenic films or sheets. Among such polyethylenic films or sheets, more preferred are linear low-density polyethylene films or sheets, low-density polyethylene films or sheets, high-density polyethylene films or sheets, and films or sheets of any mixtures of these materials. The films or sheets may each have a single-layer structure or multilayer structure.

The thickness of the olefinic film or sheet is not particularly limited and can suitably be selected, for example, from 5 to 300 μm, preferably from 30 to 250 μm, and more preferably from 50 to 200 μm.

Olefinic resins such as ethylenic polymers can be easily prepared according to a known procedure while suitably selecting conditions and parameters such as polymerization conditions and subsequent purification/fractionation conditions. Commercially available products can be also used as intact as olefinic resins.

Parting agents (mold-release agent) for constituting the releasably treated layer in the olefinic release liner are not particularly limited and can be selected from among known or common parting agents such as fluorine-containing parting agents, long-chain alkyl parting agents, fatty acid amide parting agents, molybdenum sulfide parting agents, and silica powders. Each of different parting agents can be used alone or in combination. The thickness of the releasably treated layer is not particularly limited and can be suitably set within ranges of, for example, from 0.03 to 10 μm, preferably from 0.1 to 5 μm, and more preferably from 0.3 to 2 μm.

The pressure-sensitive adhesive layer in the strips is composed of one or more known or common pressure-sensitive adhesives (self-adhesives) as main components. The content of pressure-sensitive adhesives in the pressure-sensitive adhesive layer is preferably 50 percent by weight or more, and more preferably 90 percent by weight or more. Exemplary pressure-sensitive adhesives for constituting the pressure-sensitive adhesive layer include, but are not limited to, known pressure-sensitive adhesives such as acrylic pressure-sensitive adhesives, rubber pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, fluorine-containing pressure-sensitive adhesives, and epoxy pressure-sensitive adhesives. Of these pressure-sensitive adhesives, preferred are acrylic pressure-sensitive adhesives. Each of different pressure-sensitive adhesives can be used alone or in combination. The pressure-sensitive adhesives can be pressure-sensitive adhesives of any form, such as emulsion pressure-sensitive adhesives, solvent-based pressure-sensitive adhesives, and thermofusible pressure-sensitive adhesives (hot-melt pressure-sensitive adhesives).

Exemplary acrylic pressure-sensitive adhesives include, but are not particularly limited to, pressure-sensitive adhesives containing acrylic polymers as base polymers (principal ingredients). Such acrylic polymers may be obtained through polymerization (or copolymerization) of (meth)acrylic acid esters as essential monomer components (main monomer components) and, where necessary, copolymerizable monomers (such as polar-group-containing monomers and multifunctional monomers) that are copolymerizable with the (meth)acrylic acid esters. Of (meth)acrylic acid esters, preferred are alkyl(meth)acrylates. The technique for polymerization is not particularly limited and can be any technique known by those skilled in the art, such as UV polymerization (polymerization through application of ultraviolet rays), solution polymerization, or emulsion polymerization. Among these techniques, UV polymerization is preferably employed in order to form a thick pressure-sensitive adhesive layer.

Exemplary alkyl(meth)acrylates ((meth)acrylic acid alkyl esters having linear or branched alkyl groups) for use as the main monomer components in acrylic polymers include (meth)acrylic acid $C_1$-$C_{20}$ alkyl esters such as methyl(meth)acrylates, ethyl(meth)acrylates, propyl(meth)acrylates, isopropyl(meth)acrylates, butyl(meth)acrylates, isobutyl(meth)acrylates, s-butyl(meth)acrylates, t-butyl(meth)acrylates, pentyl(meth)acrylates, isopentyl(meth)acrylates, hexyl(meth)acrylates, heptyl(meth)acrylates, octyl(meth)acrylates, 2-ethylhexyl(meth)acrylates, isooctyl(meth)acrylates, nonyl(meth)acrylates, isononyl(meth)acrylates, decyl(meth)acrylates, isodecyl(meth)acrylates, undecyl(meth)acrylates, dodecyl(meth)acrylates, tridecyl(meth)acrylates, tetradecyl(meth)acrylates, pentadecyl(meth)acrylates, hexadecyl(meth)acrylates, heptadecyl(meth)acrylates, octadecyl(meth)acrylates, nonadecyl(meth)acrylates, and eicosyl(meth)acrylates. Among them, (meth)acrylic acid $C_2$-$C_{14}$ alkyl esters are preferred, and (meth)acrylic acid $C_2$-$C_{10}$ alkyl esters are more preferred. Exemplary (meth)acrylic acid esters other than the alkyl(meth)acrylates include (meth)acrylic acid esters having alicyclic hydrocarbon groups, such as cyclopentyl(meth)acrylates, cyclohexyl(meth)acrylates, and isobornyl(meth)acrylates.

The amount of (meth)acrylic acid esters (preferably alkyl(meth)acrylates) is desirably 60 percent by weight or more, and more desirably 80 percent by weight or more, of the total amount of monomer components for the preparation of an acrylic polymer, because the (meth)acrylic acid esters are used as main monomer components of the acrylic polymer.

The acrylic polymer may further use, as monomer components, copolymerizable monomers of every kind, such as polar-group-containing monomers and multifunctional monomers. Copolymerizable monomers, if used as monomer components, help to improve the bond strength to an adhered or to increase the cohesive strength of the pressure-sensitive adhesive. Each of different copolymerizable monomers can be used alone or in combination.

Exemplary polar-group-containing monomers include carboxyl-containing monomers such as (meth)acrylic acids, itaconic acid, maleic acid, fumaric acid, crotonic acid, and isocrotonic acid, and anhydrides of them, such as maleic anhydride; hydroxyl-containing monomers including hydroxyalkyl(meth)acrylates such as hydroxyethyl(meth)acrylates, hydroxypropyl(meth)acrylates, and hydroxybutyl(meth)acrylates; amido-containing monomers such as acrylamide, methacrylamide, N,N-dimethyl(meth)acrylamides, N-methylol(meth)acrylamides, N-methoxymethyl(meth)acrylamides, and N-butoxymethyl(meth)acrylamides; amino-containing monomers such as aminoethyl(meth)acrylates, dimethylaminoethyl(meth)acrylates, and t-butylaminoethyl(meth)acrylates; glycidyl-containing monomers such as glycidyl(meth)acrylates and methylglycidyl(meth)acrylates; cyano-containing monomers such as acrylonitrile and methacrylonitrile; heterocycle-containing vinyl monomers such as N-vinyl-2-pyrrolidone, (meth)acryloylmorpholines, N-vinylpyridine, N-vinylpiperidone, N-vinylpyrimidine, N-vinylpiperazine, N-vinylpyrrole, N-vinylimidazole, and N-vinyloxazole; alkoxyalkyl(meth)acrylate monomers such as methoxyethyl(meth)acrylates and ethoxyethyl(meth)acrylates; sulfonic-containing monomers such as sodium vinylsulfonate; phosphate-containing monomers such as 2-hydroxyethylacryloyl phosphate; imido-containing monomers such as cyclohexylmaleimide and isopropylmaleimide; and isocyanato-containing monomers such as 2-methacryloyloxyethyl isocyanate. Of these polar-group-containing monomers, preferred are carboxyl-containing monomers, such as acrylic acid, and anhydrides of them. The amount of polar-group-containing monomers is, for example, 30 percent by weight or less (e.g., from 1 to 30 percent by weight), and preferably from 3 to 20 percent by weight, of the total amount of monomer components for the preparation of the acrylic polymer. Polar-group-containing monomers, if used in an amount of more than 30 percent by weight, may cause the acrylic pressure-sensitive adhesive to have an excessively high cohesive strength and to thereby have insufficient adhesion. Polar-group-containing monomers, if used in an excessively small amount (typically of less than 1 percent by weight of the total amount of monomer components for the preparation of the acrylic polymer), may cause the acrylic pressure-sensitive adhesive to have an excessively low cohesive strength and to thereby have an insufficient shearing force.

Exemplary multifunctional monomers include hexanediol di(meth)acrylates, butanediol di(meth)acrylates, (poly)ethylene glycol di(meth)acrylates, (poly)propylene glycol di(meth)acrylates, neopentyl glycol di(meth)acrylates, pentaerythritol di(meth)acrylates, pentaerythritol tri(meth)acrylates, dipentaerythritol hexa(meth)acrylates, trimethylolpropane tri(meth)acrylates, tetramethylolmethane tri(meth)acrylates, allyl(meth)acrylates, vinyl (meth)acrylates, divinylbenzene, epoxy acrylates, polyester acrylates, and urethane acrylates. The amount of multifunctional monomers is, for example, 2 percent by weight or less (e.g., from 0.01 to 2 percent by weight), and preferably from 0.02 to 1 percent by weight, of the total amount of monomer components for the preparation of the acrylic polymer. Multifunctional monomers, if used in an amount of more than 2 percent by weight of the total amount of monomer components for the preparation of the acrylic polymer, may cause the acrylic pressure-sensitive adhesive to have an excessively high cohesive strength and to thereby have insufficient adhesion (tackiness). Multifunctional monomers, if used in an excessively small amount (typically of less than 0.01 percent by weight of the total amount of monomer components for the preparation of the acrylic polymer) may cause, for example, the acrylic pressure-sensitive adhesive to have an insufficient cohesive strength.

In addition to the polar-group-containing monomers and multifunctional monomers, exemplary usable copolymerizable monomers further include vinyl esters such as vinyl acetate and vinyl propionate; aromatic vinyl compounds such as styrene and vinyltoluene; olefins or dienes such as ethylene, butadiene, isoprene, and isobutylene; vinyl ethers such as vinyl alkyl ethers; and vinyl chloride.

Among these monomer components, 2-ethylhexyl acrylate is preferred as the main monomer component; and acrylic acid is preferred as the copolymerizable monomer. The ratio (weight ratio) of the main monomer component(s) to the copolymerizable monomer(s) is preferably from 80:20 to 97:3.

Polymerization initiators (such as thermal polymerization initiators and photopolymerization initiators (photoinitiators)) for use in the preparation (curing reaction) of the acrylic polymer as the base polymer can be any known or common polymerization initiators. Typically, the polymerization initiators described in JP-A No. 2006-022189 and JP-A No. 2005-179561 may be used.

A pressure-sensitive adhesive layer for use herein preferably contains bubbles (cells) and/or hollow microspheres (hereinafter also referred to as a "bubble-containing pressure-sensitive adhesive layer"). Such bubbles and/or hollow microspheres, if contained, help the pressure-sensitive adhesive layer to follow the unevenness typically of an adherend more satisfactorily. Such pressure-sensitive adhesive layers containing bubbles and/or hollow microspheres can be, for example, the pressure-sensitive adhesive layers described in above-mentioned JP-A No. 2006-022189 and JP-A No. 2005-179561.

The bubbles are basically preferably closed cells, but they may be a mixture of closed cells and open cells. Such bubbles generally have spherical shapes, but may have distorted spheroidal shapes. The average diameter of the bubbles is not particularly limited, but may be, for example, from 1 to 1000 μm, preferably from 10 to 500 μm, and more preferably from 30 to 300 μm.

Exemplary gaseous components to be contained in the bubbles (gas component constituting bubbles; hereinafter also referred to as a "bubble-constituting gas") include, but are not limited to, gaseous components of every kind, including inert gases such as nitrogen, carbon dioxide, and argon gases, and air. It is important that, when a reaction such as polymerization reaction is carried out after incorporating a bubble-constituting gas into a pressure-sensitive adhesive composition, a bubble-constituting gas not adversely affecting the reaction should be chosen. Of such bubble-constituting gases, nitrogen gas is preferred, typically because it does not adversely affect reactions and is inexpensively available.

The amount of bubbles to be contained in the pressure-sensitive adhesive composition is not particularly limited and can be set within ranges not adversely affecting, for example, adhesive properties. The lower limit of the amount of bubbles is preferably 10 percent by volume or more, more preferably 11 percent by volume or more, and furthermore preferably 12 percent by volume or more, of the total volume of the pressure-sensitive adhesive composition, from the viewpoints of satisfactory adhesive properties. The upper limit of the amount is preferably 50 percent by volume or less, more preferably 40 percent by volume or less, and furthermore preferably 30 percent by volume or less, from the viewpoint of satisfactory cohesive strength.

The hollow microspheres may be hollow inorganic microspheres or hollow organic microspheres. Of such hollow microspheres, exemplary hollow inorganic microspheres include hollow balloons made of glass, such as hollow glass balloons; hollow balloons made of metallic compounds, such as hollow alumina balloons; and hollow balloons made of ceramics, such as hollow ceramic balloons. Exemplary hollow organic microspheres include hollow balloons made from resins, such as hollow acrylic balloons and hollow poly (vinylidene chloride) balloons.

The particle diameter (average particle diameter) of the hollow microspheres is not particularly limited, but can be selected within ranges typically of from 1 to 500 μm, preferably from 5 to 200 μm, and more preferably from 10 to 100 μm.

The specific gravity of the hollow microspheres is not particularly limited but can be selected within ranges typically of from 0.1 to 0.8 g/cm$^3$, and preferably from 0.12 to 0.5 g/cm$^3$. Hollow microspheres, if having a specific gravity of less than 0.1 g/cm$^3$, are difficult to be dispersed in a pressure-sensitive adhesive composition, because such hollow microspheres tend to float upon the composition during mixing. In contrast, hollow microspheres, if having a specific gravity of more than 0.8 g/cm$^3$, may be expensive to increase the production cost.

The amount of hollow microspheres is not particularly limited and can be selected within such ranges that hollow microspheres occupy, for example, 5 to 50 percent by volume, preferably 10 to 50 percent by volume, and more preferably 15 to 40 percent by volume, of the total volume of the pressure-sensitive adhesive layer. Hollow microspheres, if occupying less than 5 percent by volume, may not sufficiently exhibit their advantages. In contrast, hollow microspheres, if occupying more than 50 percent by volume, may cause the pressure-sensitive adhesive layer to have an insufficient bond strength.

When the pressure-sensitive adhesive layer contains bubbles and/or hollow microspheres, the pressure-sensitive adhesive composition for the formation thereof preferably further contains one or more surfactants. Use of such surfactants helps to reduce the adhesion and frictional drag between the hollow microspheres and the polymer or helps the bubbles to be contained satisfactorily and stably. Of such surfactants, preferred are fluorine-containing surfactants, of which fluorine-containing surfactants each having an oxy($C_2$-$C_3$)alkylene group and a fluorinated hydrocarbon group per molecule are more preferred. Among them, nonionic surfactants are furthermore preferred, because they can be satisfactorily dispersed in the base polymer. Each of different fluorine-containing surfactants can be used alone or in combination. Of the fluorine-containing surfactants, those described in JP-A No. 2006-022189 are preferably used.

The fluorine-containing surfactants can be also commercially available as products. Exemplary preferred commercial products include, as fluorine-containing surfactants having a weight-average molecular weight of less than 20000, products supplied under the trade names "FTERGENT 251" and "FTX-218" by NEOS Co., Ltd., products supplied under the trade names "Megafac F-477" and "Megafac F-470" by Dainippon Ink & Chemicals, Inc., and products supplied under the trade names "Surflon S-381, S-383, S-393, KH-20, and KH-40" by AGC Seimi Chemical Co., Ltd.; and, as fluorine-containing surfactants having a weight-average molecular weight of 20000 or more, products supplied under the trade names "EFTOP EF-352 and EF-801" by JEMCO Inc., and a product supplied under the trade name "Unidyne TG-656" by Daikin Industries, Ltd.

The pressure-sensitive adhesive layer may further contain suitable additives according to the purpose of use. Exemplary additives include crosslinking agents corresponding to the type of the pressure-sensitive adhesives, such as polyisocyanate crosslinking agents, silicone crosslinking agents, epoxy crosslinking agents, and alkyl-etherified melamine crosslinking agents; tackifiers including tackifiers that are solid, semisolid, or liquid at ambient temperature (room temperature) and are made from materials such as rosin derivative resins, polyterpene resins, petroleum resins, and oil-soluble phenolic resins; plasticizers; fillers; age inhibitors; antioxidants; colorants such as carbon blacks and other pigments, and dyestuffs.

The thickness of the pressure-sensitive adhesive layer for use herein may vary depending the type thereof and is not particularly limited, but is generally from about 1 µm to 5 mm. Typically, the thickness of the pressure-sensitive adhesive layer, when containing bubbles and/or hollow microspheres, is preferably 100 µm to 4 mm, and more preferably from 200 µm to 3 mm. The pressure-sensitive adhesive layer may have a single-layer structure or multilayer structure.

A resin composition for constituting the pressure-sensitive adhesive layer (pressure-sensitive adhesive composition) can be prepared by mixing components such as monomer components (e.g., main monomer components and copolymerizable monomers) constituting the base polymer, a polymerization initiator, and additives according to a known procedure. Where necessary typically for the modification of viscosity, the monomer components may be partially polymerized. Specifically, the pressure-sensitive adhesive composition may be prepared, for example, according to the following process. (i) Monomer components for constituting the base polymer are mixed with a polymerization initiator to give a monomer mixture, and (ii) a polymerization reaction corresponding to the type of the polymerization initiator (for example, polymerization through ultraviolet irradiation) is carried out on the monomer mixture to give a composition (syrup) only part of whose monomer components are polymerized. Next, (iii) the syrup is combined with hollow microspheres, fluorine-containing surfactants, and other additives according to necessity. Further, (iv) bubbles are incorporated into the composition obtained in the step (iii) (hereinafter such composition before incorporation of bubbles is also referred to as a "precursor composition") when bubbles are to be contained in the pressure-sensitive adhesive layer. The way to prepare the pressure-sensitive adhesive composition is, however, not limited to this process.

Bubbles, if to be contained in the pressure-sensitive adhesive layer, is preferably incorporated as a last component into the pressure-sensitive adhesive composition as in the above preparation process, so as help the bubbles to mix with the composition satisfactorily and to be stably contained therein. The precursor composition before incorporation of bubbles (e.g., the precursor composition obtained in the step (iii)) preferably has a higher viscosity so as to contain bubbles stably. The viscosity of the precursor composition before incorporation of bubbles is not particularly limited, but is, for example, preferably from 5 to 50 Pa·s, and more preferably from 10 to 40 Pa·s, as measured with a BH type viscometer using a No. 5 rotor at a number of revolutions of 10 rpm and at a temperature of 30° C. A precursor composition, if having an excessively low viscosity of less than 5 Pa·s, may not satisfactorily bear bubbles, because incorporated bubbles can immediately coalesce to escape out of the system. In contrast, a precursor composition, if having an excessively high viscosity of more than 50 Pa·s, may be difficult to form a pressure-sensitive adhesive layer by coating. The viscosity of the precursor composition can be adjusted typically by incorporating polymer components such as acrylic rubbers and thickening additives thereinto; or by partially polymerizing monomer components for constituting the base polymer.

The way to incorporate bubbles into the precursor composition is not particularly limited, and a known technique for mixing or blending bubbles into such compositions can be employed. An exemplary device for use herein is one that includes a disc having a through hole at the center part, a stator having a multiplicity of fine teeth and arranged on the disc, and a rotor facing the stator, having a multiplicity of fine teeth, and arranged on the disc. Using this device, the precursor composition is introduced in between the teeth of the stator and the teeth of the rotor, and a gaseous component for constituting bubbles (bubble-constituting gas) is introduced via the through hole into the precursor composition while rotating the rotor at high speed, to allow the bubble-constituting gas to be finely divided and dispersed in the precursor composition, to give a pressure-sensitive adhesive composition containing finely dispersed bubbles.

To suppress or prevent coalescence of bubbles, it is desirable to carry out the steps from the incorporation of bubbles to the formation of the pressure-sensitive adhesive layer as a series of steps. Specifically, it is desirable that a pressure-sensitive adhesive composition is prepared by mixing bubbles thereinto in the above way, and the pressure-sensitive adhesive composition is immediately subjected to the formation of the pressure-sensitive adhesive layer.

The way to form the pressure-sensitive adhesive layer is not particularly limited. Typically, it may be formed by applying the pressure-sensitive adhesive composition to a suitable carrier such as a release liner or substrate to form a pressure-sensitive adhesive composition layer, and curing (e.g., thermal curing or curing through the application of an active energy ray) and/or drying the layer according to necessity. Among such procedures, curing through the application of an active energy ray is preferably employed.

When each of the strips for use herein has a substrate layer, exemplary usable substrate layers include suitable thin articles including paper substrates such as papers; fibrous substrates such as fabrics, nonwoven fabrics, and nets; metallic substrates such as metallic foils and metallic sheets or plates; plastic substrates such as plastic films and sheets; rubber substrates such as rubber sheets; foams such as foamed (cellular) sheets; and laminates of these. Of the laminates, a laminate of a plastic substrate with another substrate; and a laminate of one or more plies of plastic films or sheets are preferred. Exemplary materials in such plastic films or sheets include olefinic resins each containing an α-olefin as a monomer component, such as polyethylenes (PEs), polypropylenes (PPs), ethylene-propylene copolymers, and ethylene-vinyl acetate copolymers (EVAs); polyester resins such as poly(ethylene terephthalate)s (PETs), poly(ethylene naphthalate)s (PENs), and poly(butylene terephthalate)s (PBTs); poly(vinyl chloride)s (PVCs); vinyl acetate resins; poly(phenylene sulfide)s (PPSs); amide resins such as polyamides (nylons) and wholly aromatic polyamides (aramids); polyimide resins; and poly(ether ether ketone)s (PEEKs). Each of different materials can be used alone or in combination.

The thickness of the substrate layer can be suitably set according typically to the strength, flexibility, and purpose of use and is not limitative, but is generally 1000 μm or less (for example from about 1 to 1000 μm), preferably from about 1 to 500 μm, and more preferably from about 3 to 300 μm. The substrate may have a single-layer structure or multilayer structure. For increasing adhesion typically with the bubble-containing pressure-sensitive adhesive layer, the substrate layer may have been subjected to a common surface treatment such as corona treatment, chromate treatment, exposure to ozone, exposure to flame, exposure to high-voltage electric shock, treatment with ionizing radiation, and other oxidization treatments by a chemical or physical procedure. In addition or alternatively, the surface may have been coated typically with a primer or a release agent.

EXAMPLES

The present invention will be illustrated in further detail with reference to several examples below. It should be noted, however, these examples are illustrated only by way of example and are never construed to limit the scope of the present invention.

The details of a double-sided acrylic foam adhesive tape (supplied by Nitto Denko Corporation under the trade name "HYPERJOINT A3012") ("HYPERJOINT" is the registered trademark of Nitto Denko Corporation) used in the examples and comparative examples below are as follows.

Tape Structure: (bubble-containing acrylic pressure-sensitive adhesive layer (1.2 mm thick))/(polyethylenic release liner (150 μm thick))
Tape Width: 8 mm
Tape Length: 80 m Example 1

Two double-sided acrylic foam adhesive tapes were joined by the method illustrated in FIGS. 2-1 to 2-4.
In the step in FIG. 2-2, the pressure-sensitive adhesive layer of one of the two tapes (strip B in FIG. 2-2) was not removed, and the pressure-sensitive adhesive layer of the other tape (strip A in FIG. 2-2) was cut and removed to a length of 15 mm from its end.

Next, with reference to FIG. 2-3, the pressure-sensitive adhesive layers were bonded by butting end cross-sections of the pressure-sensitive adhesive layers against each other. End regions of the release liners were brought at least partially into contact with each other so as to allow their sides having been faced the pressure-sensitive adhesive layers to face each other to form a superposed portion, so that the release liner 1a of the tape A lied on the pressure-sensitive adhesive layer 2b of the tape B by a length of 12 mm. In the front end region of the faced release liners, the tip of release liner 1b of the tape B extends from the tip of release liner 1a of the tape A by a length of 9 mm. In this step, the release liner 1b of the tape B was cut and removed from the tip by a length of 5 mm.

Ultimately, with reference to FIG. 2-4, the superposed portion was folded toward the tape B so that the release liner 1b of the tape B lied inside; a joint tape 20 mm long and 6 mm wide ("T-200" supplied by Nitto Lifetec Corporation) was affixed over the folded portion to form a joint, to thereby join the two double-sided acrylic foam adhesive tapes.

The joint had a structure as with that of FIG. 1, in which the portion 6 in FIG. 1 had a length of 12 mm, and the portion 5 in FIG. 1 had a length of 7 mm.

Thus, a continuous double-sided acrylic foam adhesive tape about 700 m long was prepared by joining a total of nine double-sided acrylic foam adhesive tapes by the above procedure.

Example 2

Two double-sided acrylic foam adhesive tapes were joined by the method illustrated in FIG. 3. The pressure-sensitive adhesive layer of one of the two tapes (strip B in FIG. 3) was cut and removed from its end by a length of 5 mm, and the pressure-sensitive adhesive layer of the other tape (strip A in FIG. 3) was not removed.

Next, with reference to FIG. 3, the pressure-sensitive adhesive layers were bonded by butting their end cross-sections against each other. The release liners were superposed so that one release liner (1a) partially lied on the other release liner (1b) to form a superposed portion; the superposed portion was fixed by applying the same joint tape (20 mm long and 6 mm wide) as in Example 1 to the upper and lower sides of the superposed portion, to form a joint to thereby join the two double-sided acrylic foam adhesive tapes. The superposed portions of the release liners had a length of 5 mm.

Thus, a continuous double-sided acrylic foam adhesive tape about 700 m long was prepared by joining a total of nine double-sided acrylic foam adhesive tapes by the above procedure.

Comparative Example 1

Two double-sided acrylic foam adhesive tapes were joined by the method illustrated in FIG. 4.

Removal of the pressure-sensitive adhesive layer from the end region of tapes was not conducted, but the pressure-sensitive adhesive layers were bonded by butting end cross-sections of the tapes against each other to form a bonded portion; and the release liners were fixed by applying the same joint tape (20 mm long and 6 mm wide) as in Example 1 over the bonded portion to form a joint. Thus, the two double-sided acrylic foam adhesive tapes were joined (FIG. 4).

Next, a continuous double-sided acrylic foam adhesive tape having a length of about 700 m was prepared by joining a total of nine double-sided acrylic foam adhesive tapes by the above procedure.

A PET film 25 μm thick was applied as a backing to an adhesive face of each of the continuous double-sided acrylic foam adhesive tapes prepared according to Examples 1 and 2 and Comparative Example 1, which adhesive face was opposite to the polyethylenic release liner; and the polyethylenic release liner was peeled off by hand.

In the continuous double-sided acrylic foam adhesive tapes according to Examples 1 and 2, the release liner was satisfactorily peeled off without suffering from "binding" even at the joint portion. In contrast, in the continuous double-sided acrylic foam adhesive tape according to Comparative Example 1, the release liner was not smoothly peeled off, because of "binding" at the joint portion.

While the above description is of the preferred embodiments of the present invention, it should be appreciated that various modifications, alternations, and variations are possible without deviating from the scope and fair meaning of the following claims.

What is claimed is:

1. A method for joining two strips, the two strips each including a laminate of a release liner and a pressure-sensitive adhesive layer, the release liner extending from the corresponding pressure-sensitive adhesive layer in a longitudinal end region of at least one of the two strips, the method comprising the steps of:
    butting cross-sections of longitudinal ends of the pressure-sensitive adhesive layers of the two strips against each other to thereby bond the two pressure-sensitive adhesive layers with each other; and
    bringing together end regions of the release liners of the two strips to form a superposed portion and fixing the release liners so that surfaces of the release liners in portions at least 1 mm long inward from the longitudinal ends are not in contact with surfaces of the pressure-sensitive adhesive layers.

2. A method for joining strips according to claim 1, wherein the method is carried out so that the release liner of one of the two strips partially lies on the pressure-sensitive adhesive layer of the other strip.

3. A method for joining strips according to claim 1, comprising the steps of:
    removing the pressure-sensitive adhesive layer of at least one of the two strips by at least 2 mm long from a longitudinal end of the strip so as to allow the release liner to extend from the end region of the corresponding pressure-sensitive adhesive layer;
    butting cross-sections of longitudinal ends of the pressure-sensitive adhesive layers of the two strips against each other to thereby bond the two pressure-sensitive adhesive layers with each other;
    bringing end regions of the two release liners at least partially into contact with each other so as to allow their sides having been faced the pressure-sensitive adhesive layers to face each other to form a superposed portion;
    folding the superposed portion; and
    applying a single-sided pressure-sensitive adhesive tape from above the folded portion to thereby fix the two release liners.

4. A joint structure of strips, comprising a structure of a joined portion between two strips, the two strips each including a laminate of a release liner and a pressure-sensitive adhesive layer, wherein the strips are joined by the method of claim 1 to form the joint structure.

5. A continuous strip comprising two or more strips, the strips each including a laminate of a release liner and a pressure-sensitive adhesive layer, wherein the two or more strips are joined by the method of claim 1 to form the continuous strip.

6. A method for joining two strips, the two strips each including a laminate of a release liner and a pressure-sensitive adhesive layer, the release liner extending from the corresponding pressure-sensitive adhesive layer in a longitudinal end region of at least one of the two strips, the method comprising the steps of:
    butting cross-sections of longitudinal ends of the pressure-sensitive adhesive layers of the two strips against each other to thereby bond the two pressure-sensitive adhesive layers with each other;
    superposing the two release liners in the joined portion so that a release side, the release side being a surface facing the pressure-sensitive adhesive layer, of one release liner is in contact with a back side, the back side being opposite to the release side, of the other release liner;
    affixing an adhesive face of a single-sided pressure-sensitive adhesive tape to a lower side of the superposed portion of the release liners, the lower side facing the pressure-sensitive adhesive layer, the single-sided pressure-sensitive adhesive tape having a releasable layer on its back side; and
    affixing an adhesive face of another single-sided pressure-sensitive adhesive tape to an upper side of the superposed portion, the upper side not facing the pressure-sensitive adhesive layer.

7. A joint structure of strips, comprising a structure of a joined portion between two strips, the two strips each including a laminate of a release liner and a pressure-sensitive adhesive layer, wherein the strips are joined by the method of claim 6 to form the joint structure.

8. A continuous strip comprising two or more strips, the strips each including a laminate of a release liner and a pressure-sensitive adhesive layer, wherein the two or more strips are joined by the method of claim 6.

9. A method according to claim 1, wherein the pressure-sensitive adhesive layer comprises bubbles and/or hollow microspheres.

10. A method according to claim 1, wherein the release liner comprises one or more olefinic resins.

11. A method for joining strips according to claim 2, comprising the steps of:
    removing the pressure-sensitive adhesive layer of at least one of the two strips by at least 2 mm long from a longitudinal end of the strip so as to allow the release liner to extend from the end region of the corresponding pressure-sensitive adhesive layer;
    butting cross-sections of longitudinal ends of the pressure-sensitive adhesive layers of the two strips against each other to thereby bond the two pressure-sensitive adhesive layers with each other;
    bringing end regions of the two release liners at least partially into contact with each other so as to allow their sides having been faced the pressure-sensitive adhesive layers to face each other to form a superposed portion;
    folding the superposed portion; and
    applying a single-sided pressure-sensitive adhesive tape from above the folded portion to thereby fix the two release liners.

12. A joint structure of strips, comprising a structure of a joined portion between two strips, the two strips each including a laminate of a release liner and a pressure-sensitive adhesive layer, wherein the strips are joined by the method of claim 2 to form the joint structure.

13. A joint structure of strips, comprising a structure of a joined portion between two strips, the two strips each including a laminate of a release liner and a pressure-sensitive adhesive layer, wherein the strips are joined by the method of claim 3 to form the joint structure.

14. A continuous strip comprising two or more strips, the strips each including a laminate of a release liner and a pressure-sensitive adhesive layer, wherein the two or more strips are joined by the method of claim 2 to form the continuous strip.

15. A continuous strip comprising two or more strips, the strips each including a laminate of a release liner and a pressure-sensitive adhesive layer, wherein the two or more strips are joined by the method of claim 3 to form the continuous strip.

16. A method according to claim 2, wherein the pressure-sensitive adhesive layer comprises bubbles and/or hollow microspheres.

17. A method according to claim 3, wherein the pressure-sensitive adhesive layer comprises bubbles and/or hollow microspheres.

18. A method according to claim 6, wherein the pressure-sensitive adhesive layer comprises bubbles and/or hollow microspheres.

19. A method according to claim 2, wherein the release liner comprises one or more olefinic resins.

20. A method according to claim 3, wherein the release liner comprises one or more olefinic resins.

* * * * *